(12) United States Patent
Sartre et al.

(10) Patent No.: US 8,398,515 B2
(45) Date of Patent: Mar. 19, 2013

(54) POWERTRAIN COMPRISING AN OPTIMIZED ENERGY RECOVERY SYSTEM

(75) Inventors: Vincent Sartre, Bron (FR); Thomas Justin, Brignais (FR)

(73) Assignee: Renault Trucks, St. Priest (FR)

( * ) Notice: Subject to any disclaimer, the term of this patent is extended or adjusted under 35 U.S.C. 154(b) by 595 days.

(21) Appl. No.: 12/668,471

(22) PCT Filed: Jul. 17, 2007

(86) PCT No.: PCT/IB2007/003139
§ 371 (c)(1),
(2), (4) Date: Jan. 11, 2010

(87) PCT Pub. No.: WO2009/010819
PCT Pub. Date: Jan. 22, 2009

(65) Prior Publication Data
US 2010/0184549 A1    Jul. 22, 2010

(51) Int. Cl.
*F16H 3/72* (2006.01)
*F16H 37/06* (2006.01)
*B60K 6/445* (2007.10)

(52) U.S. Cl. ............... 475/6; 475/4; 475/5; 180/65.235
(58) Field of Classification Search ................ 475/1–10; 180/65.235
See application file for complete search history.

(56) References Cited

U.S. PATENT DOCUMENTS

| 3,221,172 | A | * | 11/1965 | Rolison | 290/4 R |
|---|---|---|---|---|---|
| 3,870,116 | A | * | 3/1975 | Seliber | 180/165 |
| 3,923,115 | A | | 12/1975 | Helling | |
| 4,411,171 | A | * | 10/1983 | Fiala | 475/5 |
| 4,471,668 | A | | 9/1984 | Elsner | |
| 4,525,661 | A | * | 6/1985 | Mucsy et al. | 322/4 |
| 4,588,040 | A | | 5/1986 | Albright | |
| 5,569,108 | A | | 10/1996 | Cadee et al. | |
| 5,928,098 | A | * | 7/1999 | Imamura et al. | 475/81 |
| 6,573,626 | B1 | * | 6/2003 | Gosebruch et al. | 310/74 |
| 7,172,524 | B2 | * | 2/2007 | Moeller | 475/5 |
| 7,410,436 | B2 | * | 8/2008 | Van Druten et al. | 475/5 |
| 7,824,294 | B2 | * | 11/2010 | Van Druten et al. | 475/207 |
| 7,967,714 | B2 | * | 6/2011 | Van Druten et al. | 475/211 |
| 2007/0049443 | A1 | | 3/2007 | Schmidt | |

FOREIGN PATENT DOCUMENTS

| EP | 1894764 A1 | 3/2008 |
|---|---|---|
| JP | 11310044 | 11/1999 |
| JP | 2001275206 | 10/2001 |

OTHER PUBLICATIONS

Japanese Official Action (Mar. 22, 2012) from corresponding Japanese Application 20120-516602.
International Search Report for corresponding International Application PCT/IB2007/003139.

* cited by examiner

*Primary Examiner* — Tisha Lewis
(74) *Attorney, Agent, or Firm* — WRB-IP LLP (57) ABSTRACT

A powertrain includes a variable ratio transmission device having an input shaft coupled to an engine and an output shaft coupled to a driven unit, a three-way power split transmission device including three input/output couplings, a first of which is coupled to a flywheel and a second of which is coupled to an electrical machine. The third input/output coupling of the three way power split transmission device is mechanically coupled to the engine and to the input shaft of the variable ratio transmission device.

17 Claims, 8 Drawing Sheets

POWERTRAIN COMPRISING AN OPTIMIZED ENERGY RECOVERY SYSTEM

BACKGROUND AND SUMMARY

The invention relates to a powertrain equipped with an optimized energy recovery system comprising a flywheel.

The reduction of the fuel consumption is a major stake for the sustainability of many industries, but most important for the automotive industry and the machinery industry. A huge majority of vehicles (trucks, buses, passenger cars, etc.) is fitted with a powertrain comprising an internal combustion engine which drives the driving wheels through a transmission set (including for example a clutch or a torque converter, a manual, automated or automatic gearbox, a differential, an axle) and on another part the auxiliaries that are necessary to operate the vehicle systems. Some of these auxiliaries are fed by an electrical network, which energy comes from a generator run by the ICE. In the case of commercial vehicles, the engine is most often a turbo-charged diesel engine. Similar powertrains are used to power all sorts of machines, including construction equipment machines.

When analyzing the balance of energy used to operate a vehicle, there is a non reducible energy demand due to the drag and rolling forces that are intrinsic characteristics of the vehicle. This one being put apart, an amount of the energy which is used to drive the vehicle is wasted in the brakes, coming from potential energy kinetic energy (resulting from the energy provided to the vehicle when accelerating), and potential energy (resulting from energy provided to the vehicle during hill climbing).

Some well known technologies can limit a fraction of these losses. For example, hybrid drivelines are a known technology to achieve braking energy recovery.

A first of these technologies comprises hybrid powertrains which equip the now well-known Hybrid Electric Vehicles (HEVs) with electro-chemical storages. On a general level, HEVs comprise a powertrain associating an ICE with at least one electric machine and with at least one storage device (batteries, super capacities, inertia wheels ... ). Such a system can store an amount of the braking energy in the storage device by using the electric machine as a generator and then, at an appropriate time, redirect this energy to the driveline using the electric machine as a motor to participate to the propulsion of the vehicle.

One interesting layout for a hybrid electric vehicle is the so-called parallel hybrid layout where the transmission set of the vehicle is mechanically coupled (directly or through gearings, belts) in parallel to both the ICE crankshaft and to the electrical machine. During decelerations, the electric machine is used as a generator to slow down the vehicle and the electricity that is produced is stored in batteries or in ultra-capacitors. During accelerations, the electric machine is used as a motor and adds its power to that of the ICE, or even replaces the power of the ICE.

Hybrid powertrains are also known in the field of construction equipment machinery.

As a variant, it is also know to have hybrid powertrains with electro-mechanical storage means. Instead or in addition of batteries, an electro-mechanical device can be used where the energy is stored in kinetic form, for example in a spinning wheel also called a flywheel. In this context, the flywheel is a dedicated energy accumulating flywheel which is not to be confused with the ICE flywheel, the sole purpose of which is to smoothen the rotation of the engine. An energy accumulating flywheel needs to store a significant amount of energy which can be enough to drive the vehicle, at least as a complement to the ICE.

In a known layout, the flywheel is mechanically linked to a first electric machine, the purpose of which is to speed up or slow down the flywheel in order to increase or decrease its kinetic energy and transform it into electricity. In a parallel HEV, the electric energy derived from the flywheel can then be used in a second electrical machine to drive the vehicle. The second electrical machine is also used as a generator, during deceleration, to provide the first machine with the electricity to drive the flywheel.

Compared to electrochemical batteries, flywheels are likely to be an economic alternative when:
- rapid discharge and recharge are necessary;
- long life cycle is necessary;
- weight or volume is constrained;
- use of toxic or explosive materials is unfeasible; and/or
- environmental control is difficult.

Compared to ultracapacitors or batteries, flywheels are likely to be the economic alternative when industrial voltages must be supported.

When high energy capacities are needed, flywheels must rotate at high speeds with safety issues (risk of burst of the flywheel due to inertia forces) and technological issues (such as issues with the bearing). In the above described layout of a hybrid powertrain equipped with a flywheel, the two electrical machines need to be rated to the maximal power to be recovered. Moreover, in such a layout, all the energy recovered by the system has to be first transformed from mechanical form to electrical form, then from electrical form to mechanical form to be stored in the flywheel, and again from mechanical form to electrical form, then from electrical form to mechanical form to be used as driving power. Although electric machines have inherently good efficiency ratios, these numerous transformations necessarily lead to energy losses.

Document US-2007/0049443 discloses another type of layout for a vehicle equipped with an energy recovery system. The layout is based on a conventional ICE driveline with an ICE, a torque converter with a lock clutch, an automatic gearbox and a transmission shaft which is coupled to the final drive. On this base, an energy accumulating flywheel is coupled to the output shaft of the gearbox through a three-way power split transmission device comprising three input/output couplings, a first of which is coupled to the flywheel, a second of which is coupled to a first electrical machine and the third of which is coupled to the transmission shaft of the gearbox. The three way power split transmission is embodied as a planetary gear. The system further comprises a second electrical machine which is directly coupled with the engine output shaft. Essentially, the first electrical machine and the planetary gear form a continuously variable transmission between the flywheel and the transmission shaft, said transmission being electrically controlled by the first electrical machine.

Compared to the above described conventional layout, the layout of document US-2007/0049443 is more favorable because part of the energy recovered through the flywheel is transferred purely mechanically, that is with a high efficiency ratio. Nevertheless, this layout has some drawbacks. As can be seen from the graph of FIG. 2 in document US-2007/0049443, during acceleration or deceleration of the vehicle, the speed of the flywheel (which corresponds to its "state of charge") is heavily dependant on the vehicle speed. To keep the flywheel at a certain speed, or to bring it to that speed, the first electrical machine is constantly operated within an extended range of speeds. Only for one defined vehicle speed is the first electrical machine at rest, at which moment the recovered energy is transferred entirely mechanically. For whatever other speed, part of the energy is transferred electrically, and the more the vehicle speed is different from the defined speed, the more important the electrical part. This layout, with the three way power split transmission on the transmission output shaft, also leads to relatively big torque values being transferred trough the recovery system, which therefore need be dimensioned consequently.

Therefore, it is desirable to provide a new layout for powertrain equipped with an optimized energy recovery system comprising a flywheel, so that the size of the system can be reduced, so that it can be better integrated on a vehicle or a machine, and so that it can have a better efficiency ratio.

An aspect of the present invention provides for a powertrain comprising:
- a variable ratio transmission device having an input shaft coupled to an engine and an output shaft coupled to a driven unit
- a three-way power split transmission device comprising three input/output couplings, a first of which is coupled to a flywheel and a second of which is coupled to an electrical machine, characterized in that the third input/output coupling of the three way power split transmission device is mechanically coupled to the engine and to the input shaft of the variable ratio transmission device.

DESCRIPTION OF FIGURES

The invention will be best understood from the following detailed description which refers to the appended drawings in which.

DETAILED DESCRIPTION

Figure 1:
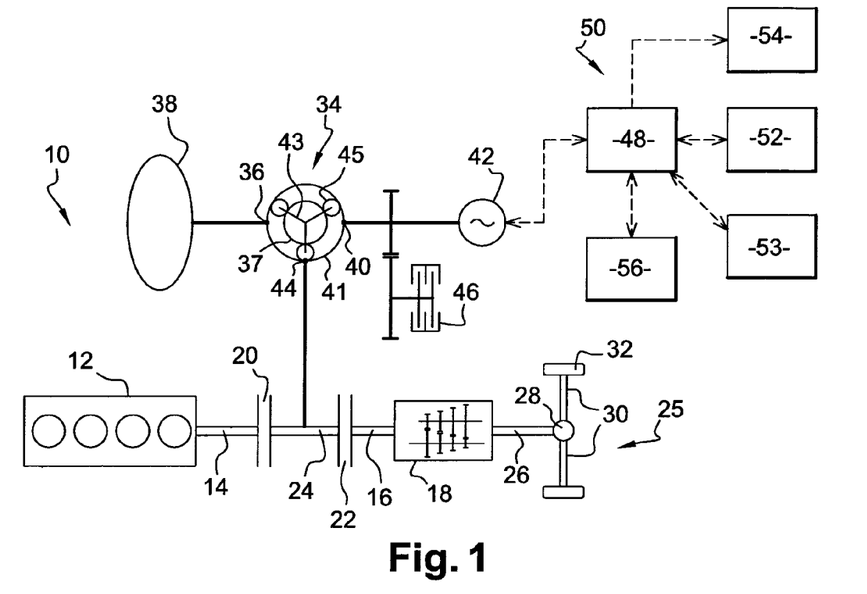
FIG. 1 is a schematic functional diagram of a first embodiment of the invention.

On FIG. 1 are shown the main elements of a powertrain 10 according to the invention, this powertrain being incorporated in a vehicle for its propulsion.

Nevertheless, it is to be noted that the powertrain according to the invention could also be used in other contexts, such as in the field of construction equipment machinery, including loaders, excavators, etc. In such a case, the driven unit would not be (or not only be) a vehicle axle, but could also be a hydraulic pump for a hydraulic power circuit.

The powertrain 10 comprises first of all an engine 12. Although the invention could be implemented within a powertrain where the engine is an electrical engine, it will be hereunder more specifically considered the case where the engine is an internal combustion engine. For commercial vehicles, especially trucks and buses, the engine can be a turbocharged diesel piston engine. The engine 12 has an output shaft 14 which is coupled to the input shaft 16 of a variable ratio transmission device 18 which, in the example shown, is a conventional discrete ratio mechanical gearbox. This mechanical gearbox could be automated, that is where the gear selection is not done manually but through actuators. The gearbox could also be a discrete ratio automatic gearbox. In special cases, one could implement the variable ratio transmission device as a continuously variable transmission (CVT).

In the example shown, the engine output shaft 14 is coupled to the gearbox input shaft 16 through a first clutch 20 and a second clutch 22, the two clutches being coupled by an intermediate shaft 24. In certain cases, such as if the gearbox has a neutral position, one of these two clutches could be dispensed with. In such a case, the intermediate shaft 24 will simply be unitary with either the engine output shaft 14 or the gearbox input shaft 16, depending on which clutch remains. In the case of an automatic gearbox, at least one of the clutches could be replaced by a torque converter.

The gearbox 18 has an output shaft which is coupled to a driven unit 25 comprising for example a propeller shaft 26, a differential 28, and two drive shafts 30 driving the two wheels 32 of a drive axle. The driven unit could be different, depending on the vehicle, for example with several driven axles.

The above mentioned components, including the engine 12, the clutch(es) 20, 22, the gearbox 18 and the driven unit 25 can be considered as forming the main driveline of the powertrain according to the invention.

According to one feature of the invention, the powertrain 10 is equipped with an energy recovery system which includes a three-way power split transmission device 34 comprising three input/output couplings. A conventional differential is such a type of device, but, in the example shown, this device is implemented as a planetary gear 34. Such a gear comprises a sun wheel 37, a ring wheel 41 coaxial with the sun gear 41, and a carrier 43 which is coaxial with the sun and ring wheels, where the sun wheel, the ring wheel and the carrier are rotatable one to the other around their common axis, and where said carrier 43 carries rotatable satellite wheels 45 which are meshed with both the sun wheel 37 and the ring wheel 41. Each of the sun wheel, of the ring wheel and of the satellite carrier can be considered as one input/output of the planetary gear. In such a gear, the speed of the three inputs/outputs are linked one to the other in way which will be explained further.

According to one embodiment of the invention, a first input/output coupling 36 of the three way power split transmission device 34 is mechanically coupled to a flywheel 38, a second input/output 40 is mechanically coupled to a first electrical machine 42, and a third input/output 44 is mechanically coupled to the engine 12 and to the input shaft of the gearbox 18. The energy recovery system can be said to include essentially the planetary gear 34, the flywheel 38 and the first electrical machine 42.

It is to be noted that the invention can be implemented with whichever of the sun wheel, the ring wheel or the planet carrier being the first, second or third input/output of the power split device. Nevertheless, at least for a commercial vehicle powertrain, a favorable layout can be achieved with the flywheel coupled to the sun wheel of the planetary gear, with the engine coupled to the satellite carrier and with the first electrical machine coupled to the ring wheel.

As can be seen on FIG. 1, the power split device 34 is coupled to the intermediate shaft 24 which extends between the two clutches. Therefore, when the first clutch 20 is engaged, the power split device is directly coupled (through a transmission device) to the engine output shaft 14, and, when the second clutch 22 is engaged, it is directly coupled to the gearbox input shaft 16. In other words, if one considers the general case of power flowing downstream along the main driveline from the engine 10 to the vehicle wheels 32, the power split device 34 is mechanically coupled to that main driveline upstream of the variable ratio transmission device 18.

As said above, the flywheel 38 is an energy accumulating flywheel which is not to be confused with the engine flywheel. Indeed, at least in the case of an internal combustion piston engine, the engine comprises its own conventional flywheel (not shown on the figures) which is dedicated to achieve a smooth engine rotation, despite of the inherently discontinuous operation of a piston engine. Calculations have shown that, for a powertrain dedicated to a medium size truck, it would be desirable for the energy accumulating flywheel to be able to store energy in the order of 100 to 300 Watt×hours. Further calculations have shown that this could be achieved with a steel disc having a diameter of less than 500 mm, weighing approximately 50 to 150 kilograms, and being rotatable up to a speed of 4500 to 9000 rpms. Such a flywheel would have an axial thickness approximately within a range of 30 to 100 mm and a moment of inertia approximately within a range of 1500 to 5000 kilogram, m2. In any case, the energy accumulating flywheel 38 can be differentiated from the engine flywheel by the fact that its rotating speed is not a linear function of the rotating speed of the engine 12.

The first electrical machine is electrically connected to a power control unit 48, the aim of which is to manage the electrical energy in the electric machine 42. The power control unit 48 is electrically connected to an electric network 50 which has a storage unit 52 (in the form of batteries, super capacities, etc.), and passive electrical auxiliaries 54 (typically vehicle electrical systems that only consume electrical energy from the power unit). The electric network 50 may also comprise active electrical loads 56, for example electric machines which are directly or indirectly mechanically coupled to one of the inputs/outputs of the power split device 34. The electric network can also comprise a resistor 53 (which can be equipped with a cooling system) to dissipate excess electric energy produced by the first electrical machine in certain operating modes where the electric storage unit 52 is full and where the other electric consumers cannot use all the produced electricity.

One or several electronic controller unit(s) (not shown) manage(s) all the components in order to make them operate properly as wanted.

The first electrical machine 42 can operate both as a motor or as a generator, and in its both rotating directions. The electrical machine 42 will be able to provide the second input/output 40 of the power split device 24 a torque, either resistive or driving, in both directions. Therefore it will either draw electric current from the electrical network or provide electrical current to the network. Calculations have shown that a suitable electrical machine could have a power rating of 20 to 80 kWh.

As can be seen on FIG. 1, a brake 46 can be provided to act on the second input/output 40 of the power split device 34, together with the first electrical machine 42. Such a brake can be of any type. It will be used to complement or replace the first electrical machine in some cases when the machine is used to provide a resistive torque to the power split unit. With such a brake, a smaller first electrical machine 42 can be used, while still yielding substantially the same beneficial results of the invention. In the depicted example, the brake is mounted in parallel to the first electric machine, for example through a gear train adapted to drive the brake in its best operating speed range. The brake could also be mounted in series simply on the shaft between the power split device and the first electrical machine if the brake and the first electric machine have the same operating speed range.

Each of the flywheel 38, the first electrical machine 42 and the engine 12 can be coupled to the corresponding input/output of the power split device 34 through a transmission, for example through two meshed wheels forming a reduction gear. As will be seen hereunder, a transmission device could be a further planetary gear used as a reduction gear, a belt and pulley transmission, etc Preferably, these transmission devices are mechanical devices giving a constant ratio of angular speeds between input and output. These transmissions can have a clutch to decouple input and output.

In this first embodiment of the invention shown on FIG. 1, the powertrain 10 has no active loads. As will be seen, all the energy which is used to run the first 42 electric machine comes from the electrical storage 52. The powertrain 10 must thus be tuned in order to reduce the rating of the electrical storage (in terms of capacity and of charging/discharging power) through a proper choice of the characteristics of the transmission and of the planetary gear 34.

The powertrain 10 according to the invention has different operating modes, some of which are described below, with reference to FIGS. 10 to 14b FIGS. 10, 11a, 12a, 13a, 14a are based on the conventional speed diagram of a planetary gear. In the example shown, it is recalled that the sun wheel 37 is coupled to the flywheel 38, the ring wheel 41 is coupled to the first electrical machine 42 and the carrier 43 is coupled to the engine 12. On such a speed diagram the three vertical axis S, C, R represent respectively the rotating speed axis of the sun wheel 37, of the carrier 43 and of the ring 41 wheel with respect to the value 0 represented by the horizontal axis. Of course, the speed can be positive or negative depending on the rotation direction of each of these components. Especially, the ring wheel and the sun gear can rotate in the same direction or in opposite directions depending on the rotation speed of the carrier. In such a diagram, the axis S, C, R are spaced apart so that the ratio of distance between axis S and C to the distance between axis C and R is proportional the ratio of the diameter of the ring wheel to the diameter of the sun wheel. In such a case, the rotation speeds of the three components are interrelated so that their representative locations on their respective axis are aligned. In other words, with such a diagram, it is possible to know the speed of component by knowing the speed of the other two components.

Figure 10:
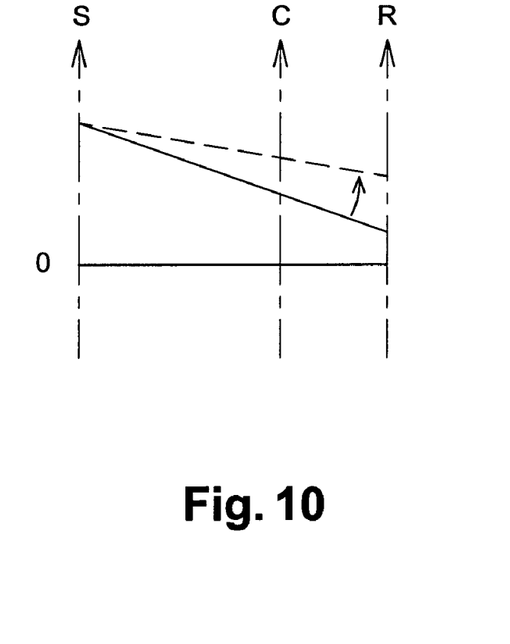
FIG. 10 is speed diagram showing the speed relationship which links the three input/output couplings in a planetary gear

On FIG. 10 is shown the case where, from an initial state of operation, shown as a solid line, no torque is provided by the first electrical machine 42. It is recalled that, in a planetary gear 34, the torques applied on the three inputs/outputs are by nature balanced as on a lever.

In such a case, any increase in the carrier speed (i.e. the engine speed, and consequently the vehicle speed) will simply result in an increase of the electrical machine speed which is coupled to the ring wheel, the flywheel (coupled to the sun wheel) keeping its previous speed. Therefore no power is transferred to or from the electrical network 50 and no power is transferred to or from the flywheel 38. No torque is transmitted through the power split device 34, and the engine 12 provides all the energy to drive the vehicle transmission.

Figure 11A:
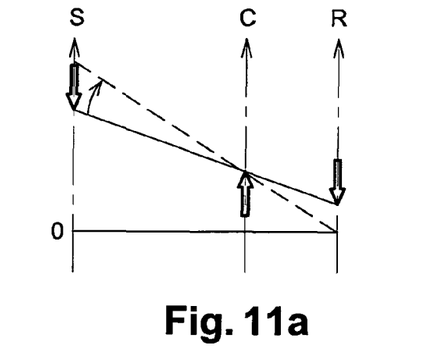
FIGS. 11a and 11b are respectively a speed diagram and a functional diagram showing the respective speeds and power flows for a specific use configuration in which the flywheel can be charged.
Figure 11B:
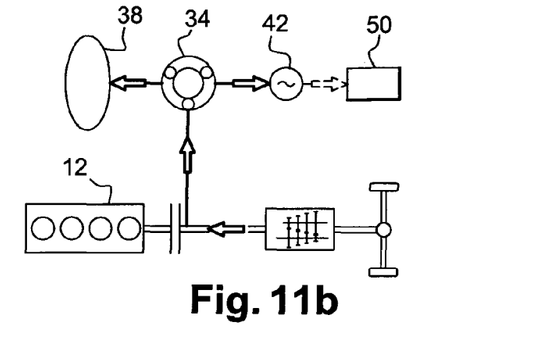
Figure 12A:
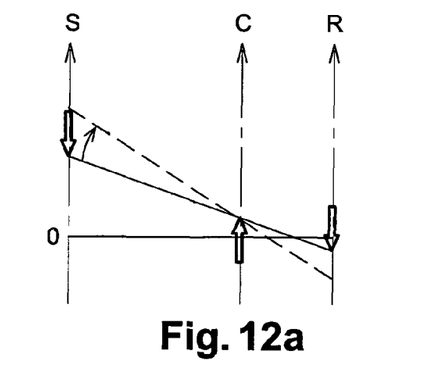
FIGS. 12 and 12b are respectively a speed diagram and a functional diagram showing the respective speeds and power flows for another use configuration in which the flywheel can be charged.
Figure 12B:
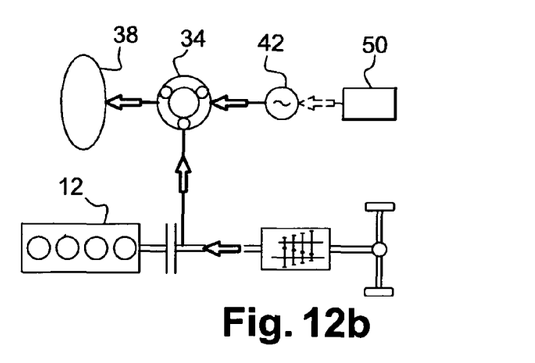

On FIGS. 11*a* and 12*a* are shown two cases where regenerative braking is occurring. This is shown on the simplified functional diagrams of FIG. 1*ib* and 12*b* (which correspond respectively to the speed diagrams of FIGS. 11*a* and 12*a*) where it is represented by an arrow that the main driveline is able to contribute power to the power split device 34. This power decelerates the vehicle without the use of the vehicle service brakes. We will use the convention according to which the torque applied by the main driveline to the power split device 34 in such a case is positive, represented by an upward arrow on the speed diagram. On FIG. 1*lb* is represented the corresponding power flux in the system. In such a case, the first electrical machine 42 can be controlled in order to force the power split device 34 to send some power through its third input/output to the flywheel 38 so as to increase its rotating speed, thereby transforming this transferred power into energy stored in mechanical form. Therefore, as can be seen on FIG. 11*a*, the first electrical machine 42 can be controlled to exert a certain torque on the power split device 34. Depending on the rotation direction of the electrical machine 42 (opposite cases are shown on FIGS. 11*a*, 12*a* and FIGS. 1*ib*, 12*b*), the electrical machine 42 will be controlled either as generator (whereby it extracts mechanical power from the power split device 34, as shown on FIG. 1*ib*, this power being transformed into electricity and provided to the electrical network 50), or as a motor (whereby it provides mechanical power to the power split device 34, as shown on FIG. 12*b*, this power being provided by the electrical network 50) to, in both cases, apply on the power split device a torque which, according to the above convention, is negative (see FIGS. 11*a* and 12*a*). By doing so, a negative torque is applied by the flywheel 38 on the power split device 34, which means that, inversely, a positive torque is applied by the power split device 34 to the flywheel 38. Thereby, assuming that the flywheel 38 is initially rotating in the positive direction, it means that the flywheel will accelerate and indeed store some additional energy recovered from the main driveline. As can be seen, the energy recovery system operates at the same time mechanically and electrically and the recovered energy is thus transferred and stored through two forms, both mechanically and electrically.

The balance between the recovered electric energy and the electric energy needed to supply both the power split device and the electrical network can be tuned by choosing appropriate planetary gear ratios. This energy balance can be further tuned by the gearshift strategy. For instance, in case of an automatic or automated gearbox, speeds upstream of the gearbox can be increased during braking and lowered during vehicle take-off in order to maximize electric energy regeneration by the first electric motor.

It is to be noted that, when a resistive torque is needed on the second input/output 40 of the power split device 34 (i.e. the ring wheel 41 in our example), the first electrical machine 42 can be either supplemented or replaced by the brake 46 to provide such torque. This may be desirable in various operating cases. It may for instance be of interest when the electrical machine 42 would be used as a generator, for example in the case where the batteries 52 are full so that it is not possible anymore to store electricity. In any case, the presence of the brake 46 can help in reducing the electrical machine's rating because at least part of the resistive torque can be provided by the brake 46, which of course may lead to using a cheaper, lighter and less bulky electrical machine and electric energy storing system.

The extra torque supplied by the brake can enable to start the ICE either when the vehicle is at stand still or when the vehicle is running in flywheel mode. When starting the ICE when the vehicle is at stand still, the first clutch can be closed without energy loss (the carrier will be stopped as long as no torque is applied on the brake or the first electric motor). Applying torque with the brake will start the ICE. The energy loss in the brake is compensated by avoiding the energy loss that usually occurs in the first clutch when connecting the ICE to the gearbox. When starting the ICE and synchronizing its speed to that of the gearbox input, when vehicle is running in flywheel mode, the additional torque supplied by the brake avoids torque loss on the driven unit. This improves the driving comfort. Moreover, the brake is adapted to start up the flywheel when it is discharged. In such a case, all the energy coming from the drive train and/or from the engine can be transferred to the flywheel, because, the second input/output of the power split device being blocked by the brake, no power is send to that input/output.

To get the energy from the flywheel 38, the latter must be decelerated by applying a resistant torque on its shaft, whereby inversely, the flywheel 38 will apply a motoring torque on the power split device's first input/output 36. As above, this can be achieved by proper control of the first electrical machine 42 (and/or of the brake 46 if present).

Figure 13A:
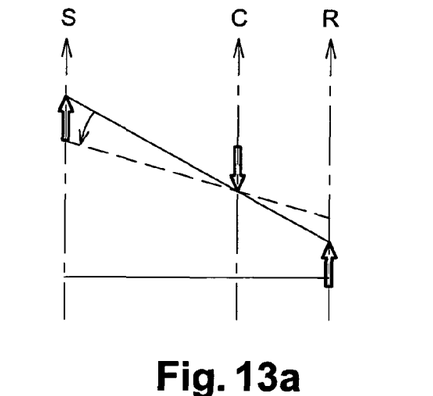
FIGS. 13a and 13b are respectively a speed diagram and a functional diagram showing the respective speeds and power flows for a specific use configuration in which the flywheel can be discharged.
Figure 13B:
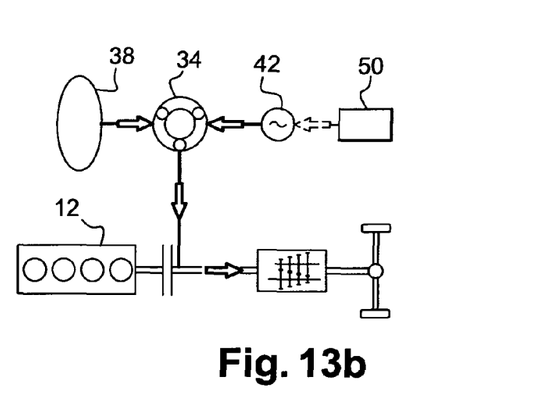
Figure 14A:
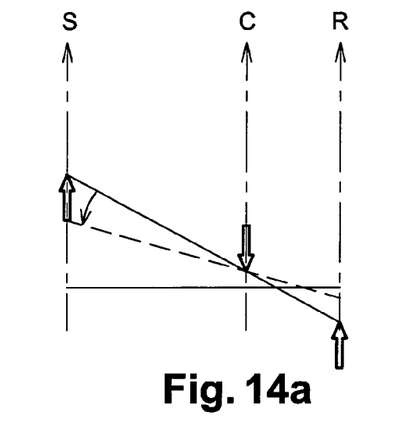
FIGS. 14a and 14b are respectively a speed diagram and a functional diagram showing the respective speeds and power flows for another use configuration in which the flywheel can be discharged.
Figure 14B:
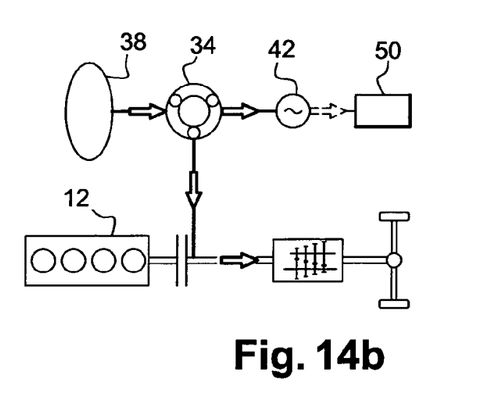

Such a case is shown on the simplified functional diagrams of FIGS. 13*b* and 14*b* (which correspond respectively to the speed diagrams of FIGS. 13*a* and 14*a*) where it is represented by an arrow that the flywheel 38 is able to contribute power to the power split device 34. This torque is the counterpart of the flywheel deceleration. We use the convention according to which the torque applied by the flywheel 38 to the power split device 34 in such a case is positive, represented by an upward arrow on the speed diagrams. Of course, the aim is to have at least part of the energy provided by the flywheel 38 be sent to the vehicle wheels. Therefore, as can be seen on FIG. 13*a*, the first electrical machine 42 needs to be controlled to exert a certain torque on the power split device 34. Depending on the rotation direction of the electric machine (opposite cases are shown on FIGS. 13*a*, 14*a* and FIGS. 13*b*, 14*b*), the electrical machine 42 will be controlled either as generator (whereby it extracts mechanical power from the power split device 34, as shown on FIG. 14*b*, this power being transformed into electricity and provided to the electrical network 50), or as a motor (whereby it provides mechanical power to the power split device 34, as shown on FIG. 13*b*, this power being provided by the electrical network 50) to, in both cases apply, on the power split device 34 a torque which, according to the above convention, is positive. By doing so, a negative torque is applied by the main driveline on the power split device 34, which means that, inversely, a positive torque is applied by the power split device 34 to the flywheel 38. Thereby, assuming that the main driveline is initially rotating in the positive direction, it means that the main driveline will tend to accelerate and indeed benefit from some recovered energy. As can be seen again, the energy recovery system operates at the same time mechanically and electrically and the recovered energy is thus transferred through two forms, both mechanically and electrically.

Figure 2:
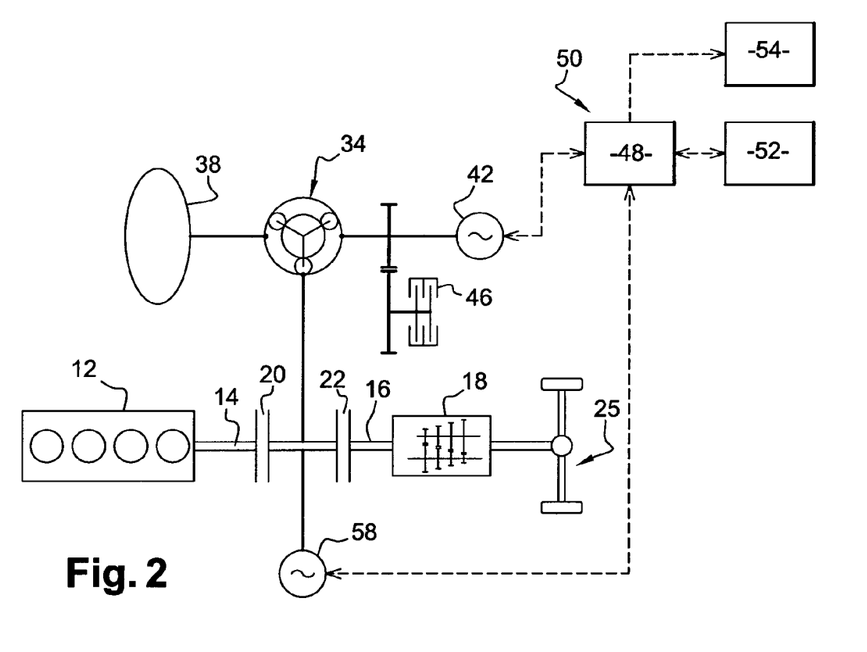
FIGS. 2 to 4 are figures similar to FIG. 1, showing respectively a second, a third and a fourth embodiment of the invention.

On FIG. 2 is shown a second embodiment of the invention, which is virtually identical to the first embodiment, except for an additional electric machine 58 which is mechanically coupled to the engine output shaft 14 (or in other words with the gearbox input shaft 16) through a mechanical transmission with a constant ratio (not shown). This second electrical machine 58 is essentially a traction motor which forms, together with the engine 12, a hybrid parallel traction power unit where both the engine and the motor are able to drive the vehicle, either together or independently. The second electrical machine 58 is electrically coupled to the electrical network 50, so that it can draw or provide electrical current from/to the network. Therefore, the second electrical machine 50 can draw current from the electrical storage unit 52 or from the first electrical unit 42 when the latter is used as a generator. Conversely, the second electrical machine 58 can also be operated as a generator and provide current to be stored in the electrical storage unit 52 or to be used in the first electrical machine 42 when it operates as a motor.

The second electrical machine allows a transfer of energy between the flywheel and the batteries in order to manage the state of charge (SOC) of both of them independently. In addition, the second electric machine 58 can assist in supplying the first electric machine 42 in certain operating conditions where it is possible to mechanically draw energy from the main driveline, so that the size of the batteries can be optimized. Also, the second electric machine 58 can be rated in order to provide most of the energy to operate the first electrical machine 42, so that the size of the batteries can be minimized. To the extreme, the batteries could simply be omitted.

In the case of a powertrain for driving a medium sized truck, such a second electrical machine could have a power rating of approximately 20-80 kWh.

Figure 3:
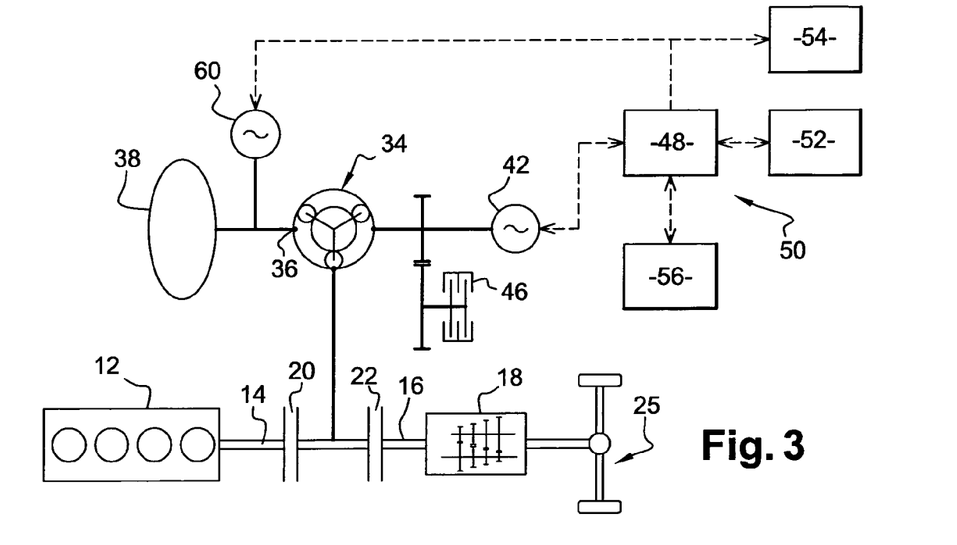

On FIG. 3 is shown a third embodiment of the invention which is very similar to the second embodiment, except that a third electrical machine 60 is provided (in place of the second electrical machine of embodiment T) which is mechanically coupled to the flywheel 38 (or in other words with the first input/output of the power split device 34) through a mechanical transmission with a constant ratio. This third electrical machine 60 is of course electrically connected to the electrical network 50, so that it can draw or provide electrical current from/to the network, depending on whether it is operated as a motor or a generator. Therefore, the third electrical machine 60 can draw current from the electrical storage unit 52 (or from the first electrical unit 42 when the latter is used as a generator) to speed up the flywheel 38. Conversely, the third electrical machine can also be operated as a generator and provide current to be stored in the electrical storage unit 52 when it operates as a motor drawing its energy from the flywheel 38.

As in the second embodiment, the third electric machine 60 can be used to transfer energy from one storage means to the other, in order to manage their state of charge independently.

The third electric machine 60 can also assist the batteries to operate the first electrical machine by using an amount of energy from the flywheel 38. At last, the third electric machine 60 can be rated in order to provide most of the energy to operate the first electrical machine 42, so that the size of the batteries can be minimized.

Figure 4:
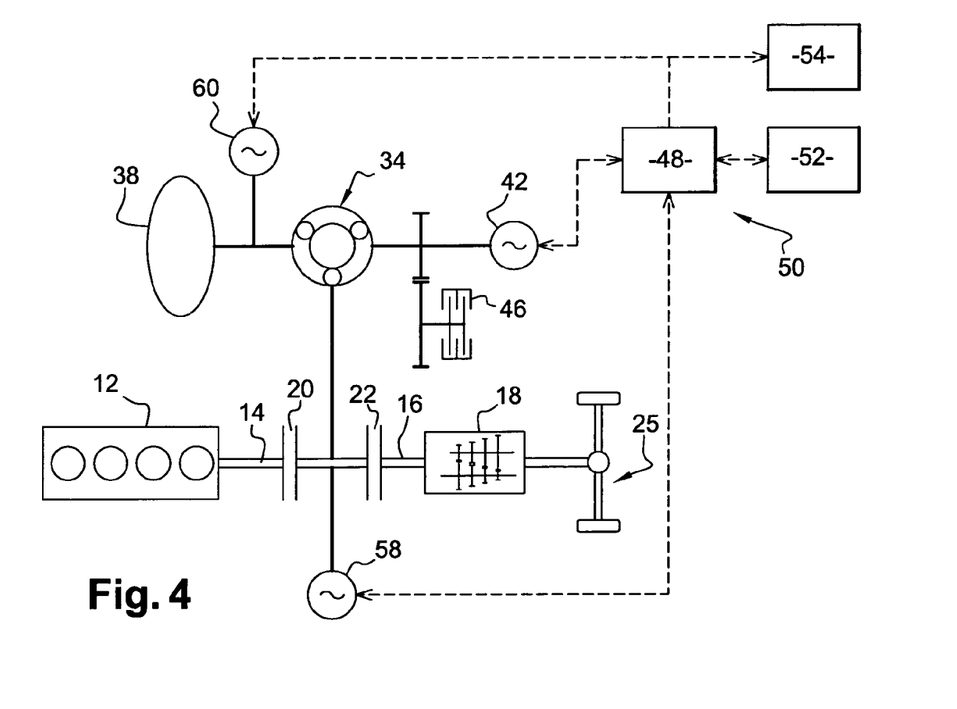

The fourth embodiment shown on FIG. 4 is simply a combination of the second and third embodiments, with both the second 58 and the third 60 electrical machines as described above. This embodiment has the advantage of allowing an optimum and flexible management of the energy recovery, optimizing the use and storage of the energy. This embodiment enables to transfer part of the energy in electric mode to and from the flywheel.

In all the cases above, it is optimum to have the power split device 34 which is coupled to the main driveline "upstream" of the variable ratio transmission device 18. Indeed, such a transmission device 18 is used to multiply the torque available for the driven unit for a given power output of the engine, simply by decreasing the rotation speed. Therefore, in general, the torque values which will transit through the power split device 34 will be lower if the latter is coupled "upstream" of the gearbox rather than downstream. This in itself allows using smaller, lighter and cheaper components for the power split device.

Also, the power split device being coupled upstream of the gearbox 18, its second input/output 40 is maintained with a speed range which is not too extended. Indeed, if the engine is a diesel engine for a commercial truck, the engine will operate approximately between 600 and 2400 rpms, which represents a factor of 4 between the minimum and the maximum speed. Downstream of the gearbox 18, such a factor would be much greater. From there, it must be taken into consideration that the electrical machine must have an even wider range of operation, because it must be varied as function of the speed of the main driveline and of the speed of the flywheel 38 according to the speed diagrams to achieve the power split effect. Therefore, the first electrical machine 42 has to be able to operate under wide ranges and it is of course of interest to minimize that operating range so that a less expensive machine can be used. A major benefit is to operate the electric machine near its points of best efficiency.

FIGS. 5 to 9 show very schematically how the energy recovery system can be structurally integrated in the powertrain according to the invention. On those figures, clutches 20, 22 are omitted.

Figure 5:
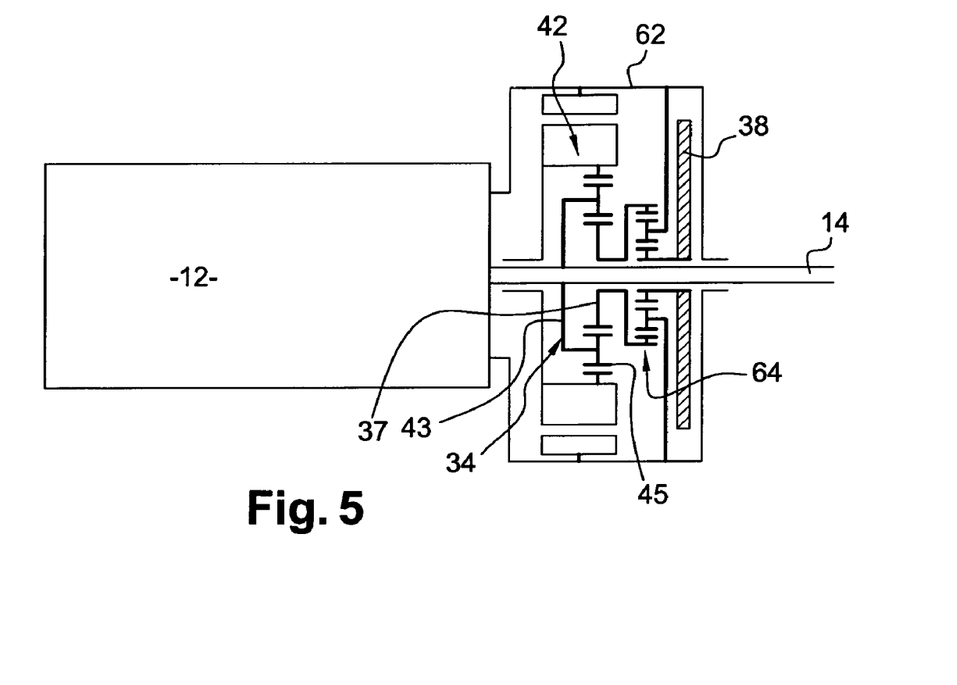
FIG. 5 and FIG. 6 are each a schematic view of respectively a first and a second possible structural implementation of the first embodiment of FIG. 1.

On FIG. 5 is shown one possible structural embodiment of the first functional embodiment of FIG. 1. One can see that the planetary gear 34, the flywheel 38 and the first electrical machine 42 of the energy recovery system are all mounted coaxially on the engine output shaft 14, and can therefore be comprised within a common housing 62 which can be a mere enlargement of the conventional engine flywheel and clutch housing provided on conventional piston engines. Thus, the energy recovery system can be very tightly packed, without changing the general layout on the powertrain compared to a conventional vehicle. The only modification is basically and slight increase of the engine lengths by approximately 15 to 30 centimeters. A part from that, the only bulky additional element is the electrical storage means, which can be located anywhere on the vehicle. In this embodiment, it appears that the flywheel 38 is coupled to the sun wheel 37 of the planetary gear through an auxiliary planetary wheel 64, the engine output shaft 14 is coupled directly to the satellite carrier 43 and the first electrical machine 42 is directly coupled to the ring wheel 41. In fact, in this first embodiment, the ring wheel 41 is unitary with the first electrical machine's rotor, or at least affixed to it.

Figure 6:
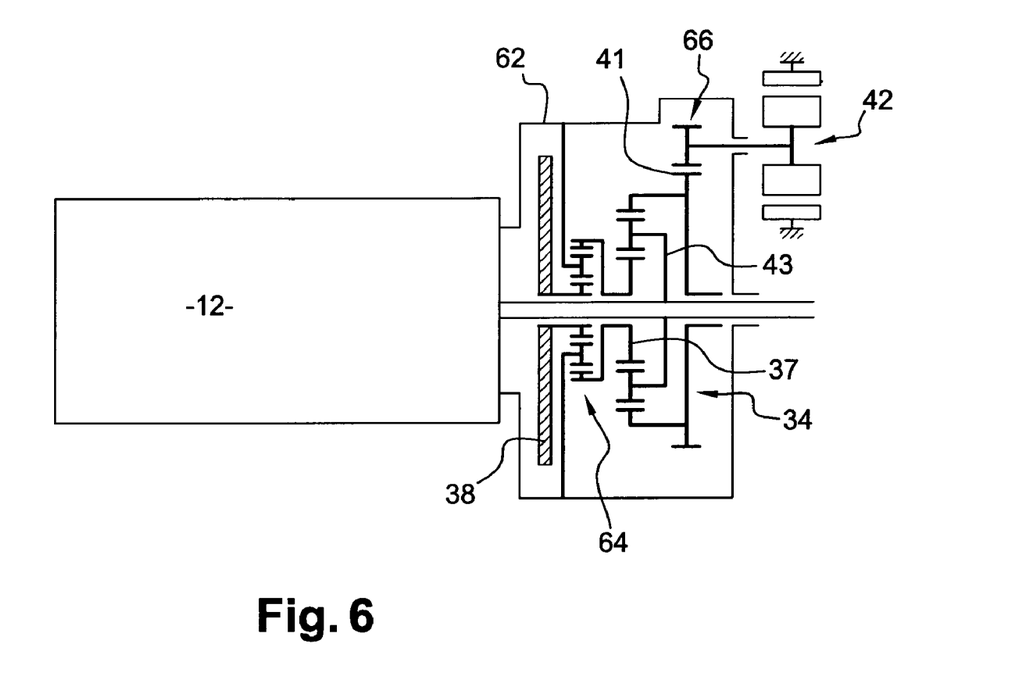

On FIG. 6 is shown another possible structural embodiment of the first functional embodiment of FIG. 1. Compared to that of FIG. 6, the flywheel, the planetary gear and the auxiliary planetary gear 64 have simply been reversed axially, with the flywheel 38 on the engine side of the housing 62 rather than on the gearbox side of the housing. More importantly, the first electrical machine 42 is not anymore integrated in the housing 62. It is now set in parallel to the flywheel axis, and it is coupled through a gearing mechanism 66 to the ring wheel 41 of the power split device 34. This layout allows using a first electrical machine 42 having a smaller diameter.

Figure 7:
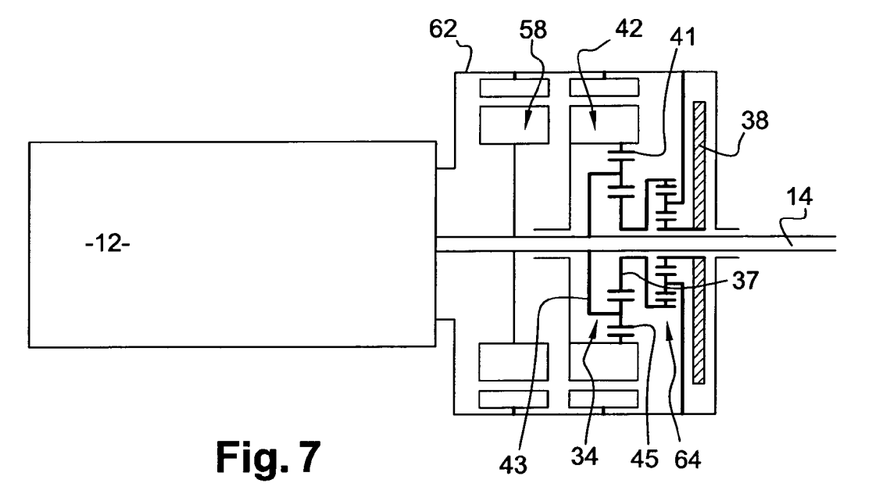
FIG. 7 and FIG. 8 are each a schematic view of respectively a first and a second possible structural implementation of the second embodiment of FIG. 2.

On FIG. 7 is shown one possible structural embodiment of the second functional embodiment of FIG. 2. This embodiment is directly derived from that of FIG. 5, where the second electrical machine 58 is also integrated in the same housing 62. This second electrical machine's rotor is directly coupled to the engine output shaft. In the figure, the second electrical is shown on the engine side of the housing, between the engine and the recovery system, but it could also be located on the other side of the energy.

Figure 8:
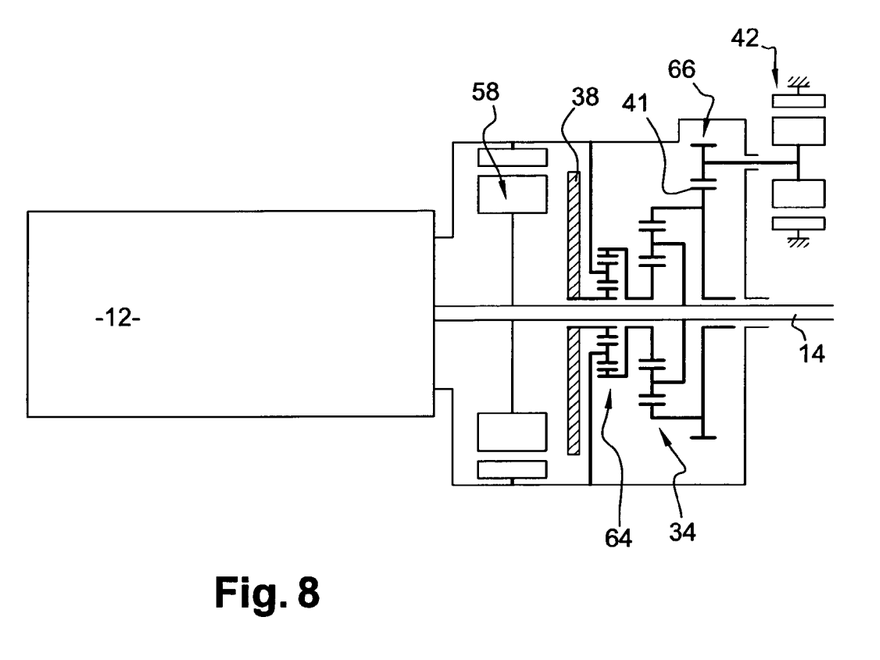

On FIG. 8 is shown another possible structural embodiment of the second functional embodiment of FIG. 2, showing the same difference with the embodiment of FIG. 7 than the difference between the embodiments of FIGS. 6 and 5, that is with a non-coaxial externally located small diameter first electrical machine 42 which is coupled to the planetary gear's ring wheel 41 through a gearing 66.

Figure 9:
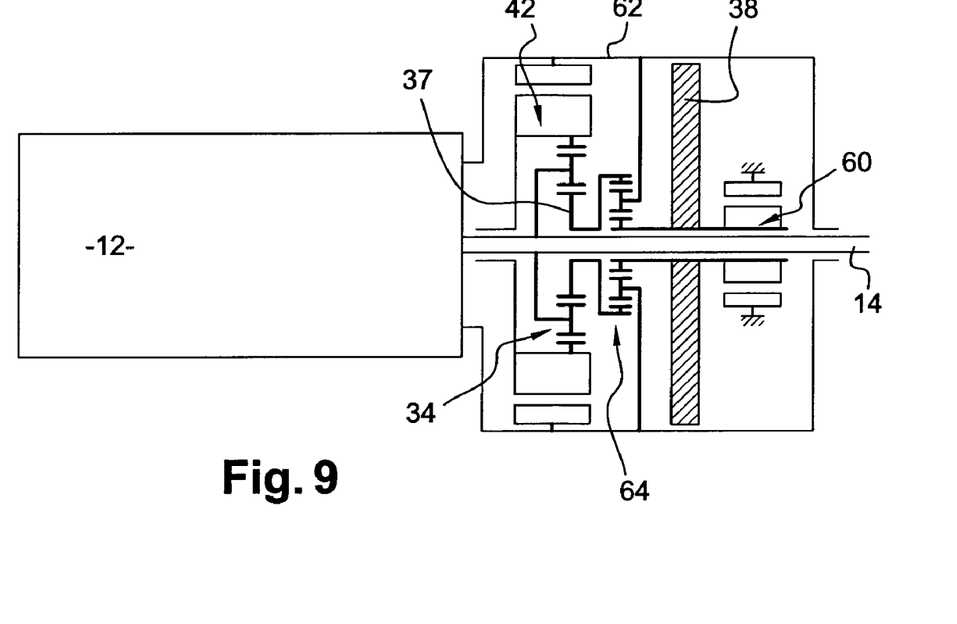
FIG. 9 is a schematic view of a possible structural implementation of the third embodiment of FIG. 3.

On FIG. 9 is shown one possible structural embodiment of the third functional embodiment of FIG. 3. This embodiment is directly derived from that of FIG. 5, except that it can be seen that the third electrical machine 60 is coupled together with the flywheel 38 on the same shaft of the planetary gear 64, the second electrical machine being absent.

Figure 15:
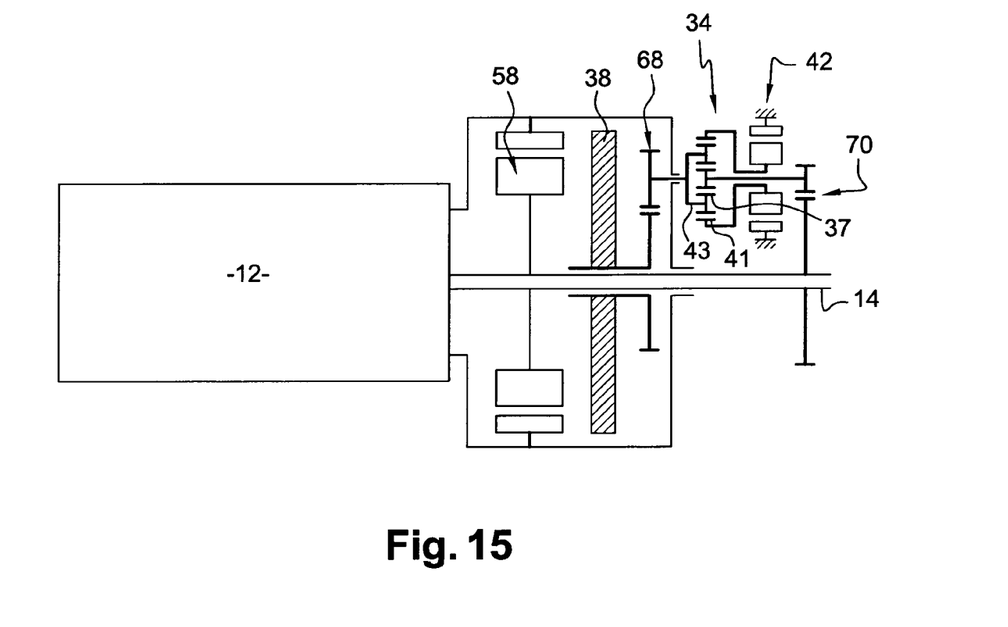
FIGS. 15 and 16 are each a schematic view of further possible structural implementations of the second embodiment of FIG. 2.
Figure 16:
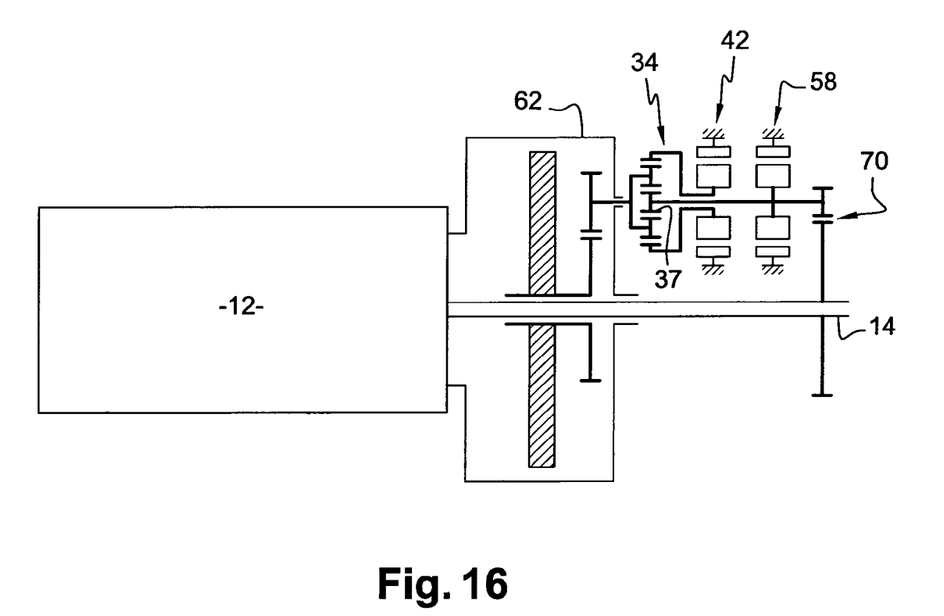

FIGS. 15 and 16 show further alternate embodiments of the second functional embodiment of FIG. 2 where, instead of having the power split device integrated in the flywheel housing, it is located outside of that housing, on a parallel axis. In both of theses embodiments, the power split device 34 has its ring gear 41 which is directly coupled to the rotor of the first electrical machine 42, which is here a small diameter machine as in the embodiment of FIG. 8. The power split device 34 and the first electrical machine 42 are here coaxial. The carrier 43 of the power split device is mechanically coupled to the flywheel 38 through meshed gears 68 (which in this case are integrated in the flywheel housing 62), and the sun wheel 37 is coupled with the output shaft 14 of the engine 12 through another set of meshed gears 70 (which is in this case located outside of the flywheel housing).

In the embodiment of FIG. 15, the second electrical machine 58 is coaxial with the output shaft 14 to which its rotor is directly coupled, and it is located within the flywheel housing 62.

In the embodiment of FIG. 16, the second electrical machine 58 is located outside of the flywheel housing. It is in fact a small diameter machine, coaxial with the first electrical machine and with the power split device. It's rotor is directly coupled to a shaft which connects the sun wheel 37 to the set of meshed gear 70, so that the second electrical machine is mechanically coupled to the output shaft 14.

Figure 17:
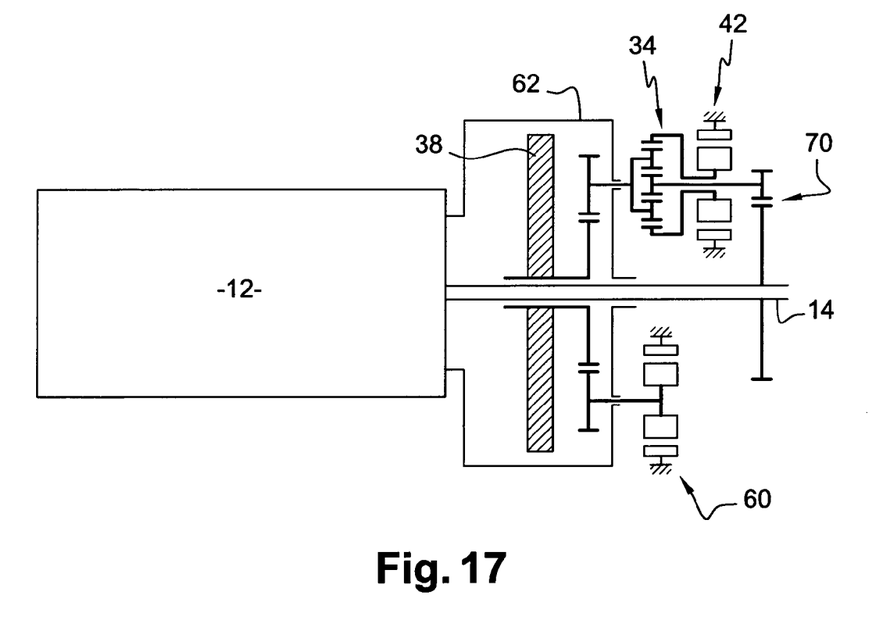
FIG. 17 is a schematic view of further possible structural implementations of the third embodiment of FIG. 3.

In FIG. 17 is shown an alternate structural embodiment of the third functional embodiment of FIG. 3. This embodiment has the same layout as the embodiment of FIG. 15 with respect to the power split device and the first electrical machine. It does not have a second electrical machine (although it could well be provided), but a third electrical machine 60. The third electrical machine 60 is a small diameter machine, external to the flywheel housing 62, and not coaxial neither with the output shaft 14 nor with the power split device 34. In fact, the third electrical machine is also coupled to the flywheel 38 through a set of meshed gearings.

The invention claimed is:

1. Powertrain comprising:
   a variable ratio transmission device having an input shaft coupled to an engine and an output shaft coupled to a driven unit;
   a three-way power split transmission device comprising three input/output couplings, a first of which is coupled to a flywheel and a second of which is coupled to an electrical machine; and
   a brake coupled to the second input/output coupling of the three-way power split transmission device, in parallel to or in series with the first electric machine;
   wherein the third input/output coupling of the three way power split transmission device is mechanically coupled to the engine and to the input shaft of the variable ratio transmission device.

2. Powertrain according to claim 1, wherein the power split transmission device is a planetary gear comprising a sun wheel, a ring wheel coaxial with the sun wheel, and a carrier which is coaxial with the sun and ring wheels, where the sun wheel, the ring wheel and the carrier are rotatable one to the other around their common axis, and where the carrier carries rotatable satellite wheels which are meshed with both the sun wheel and the ring wheel.

3. Powertrain according to claim 1, wherein the flywheel is coupled to the first input of the power split transmission device through a reduction gear.

4. Powertrain according to claim 3, wherein the reduction gear comprises a further planetary gear.

5. Powertrain according to claim 1, wherein the electrical machine is electrically connected to electrical auxiliaries and/or to electrical storage means and/or to an electric resistor.

6. Powertrain according to claim 1, comprising a second electrical machine which is mechanically coupled to the driven unit.

7. Powertrain comprising:
   a variable ratio transmission device having an input shaft coupled to an engine and an output shaft coupled to a driven unit;
   a three-way power split transmission device comprising three input/output couplings, a first of which is coupled to a flywheel and a second of which is coupled to an electrical machine; and
   a second electrical machine which is mechanically coupled to the driven unit,
   wherein the third input/output coupling of the three way power split transmission device is mechanically coupled to the engine and to the input shaft of the variable ratio transmission device, wherein the second electrical machine is mechanically coupled to the input of the variable ratio transmission device.

8. Powertrain according to claim 1, wherein the variable ratio transmission device is a discrete ratio gearbox.

9. Powertrain according to claim 8, wherein the discrete ratio gearbox is a mechanical or automatic gearbox.

10. Powertrain according to claim 8, wherein the discrete ratio gearbox is an automated mechanical gearbox.

11. Powertrain according to claim 1, wherein the engine is coupled to the input of the variable ratio transmission device through at least one clutch mechanism.

12. Powertrain according to claim 6, comprising a third electrical machine which is mechanically coupled to the flywheel.

13. Powertrain according to claim 1, wherein the flywheel and the three-way power split transmission device are integrated coaxially in a housing fixed on the engine.

14. Powertrain according to claim 13, wherein the first electrical machine is mounted coaxially in the housing.

15. Powertrain according to claim 13, wherein the first electrical machine is mounted in parallel to the flywheel axis.

16. Powertrain according to claim 6, wherein the flywheel and the three-way power split transmission device are integrated coaxially in a housing fixed on the engine, and the second electrical machine is mounted coaxially in the housing.

17. Powertrain according to claim 2, wherein the flywheel is coupled to the sun wheel of the planetary wheel, the engine is coupled to the satellite carrier and the electrical machine is coupled to the ring wheel.

* * * * *